United States Patent

[11] 3,614,490

| [72] | Inventor | Sven Gunnar Soredal<br>Stockholm, Sweden |
|---|---|---|
| [21] | Appl. No. | 887,547 |
| [22] | Filed | Dec. 23, 1969 |
| [45] | Patented | Oct. 19, 1971 |
| [73] | Assignee | LKB-Produkter Aktiebolag<br>Mariehall, Sweden |
| [32] | Priority | Dec. 27, 1968 |
| [33] | | Sweden |
| [31] | | 17821 |

[54] MEANS FOR MEASURING THE SQUARE OF THE STRENGTH OF A MAGNETIC FIELD
16 Claims, 9 Drawing Figs.

[52] U.S. Cl. ..................................................... 310/25,
   310/27, 324/47, 318/119
[51] Int. Cl. ....................................................... H02k 35/04
[50] Field of Search............................................ 310/25,
   36–39, 27, 15; 318/139, 132, 133; 335/222, 223,
   224; 324/46, 47, 48; 250/41.9 ME

[56] References Cited
UNITED STATES PATENTS

| 2,435,487 | 2/1948 | Adler ............................ | 250/36 |
| 2,926,313 | 2/1960 | Wiegand ....................... | 331/154 |
| 2,478,712 | 8/1949 | Rockwell....................... | 310/25 X |
| 3,496,391 | 2/1970 | McShan ........................ | 310/25 |
| 2,854,581 | 9/1958 | Scarrott......................... | 310/15 X |
| 3,493,851 | 2/1970 | Mogilevsky ................... | 324/47 |

Primary Examiner—D. F. Duggan
Assistant Examiner—B. A. Reynolds
Attorney—McGlew and Toren ABSTRACT: A device for measuring the square of the strength of a magnetic field is disclosed. The device is particularly operable to measure mass numbers. A number of mechanically oscillating resiliently suspended conductors (primary circuit) connected to an alternating current source are arranged in said magnetic field. Means are provided for measuring the voltage induced in said conductors, said voltage being substantially proportional to the square of the strength of the magnetic field. Said measuring means may include a secondary circuit mechanically connected to the primary circuit, voltage measuring means being connected to said secondary circuit.

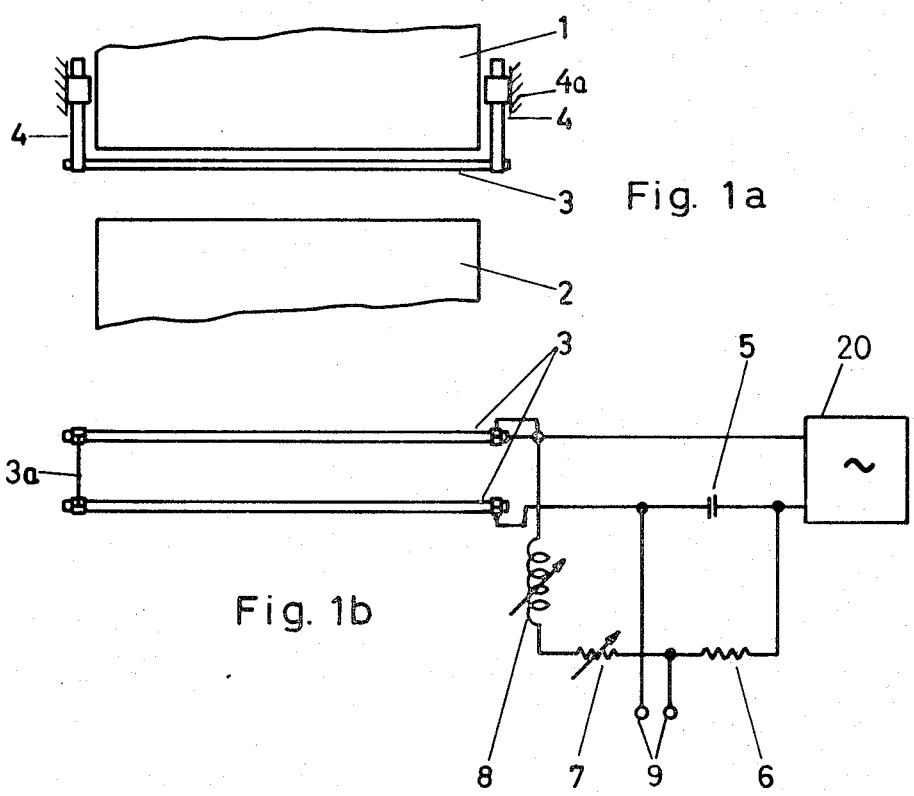
Fig. 1a
Fig. 1b
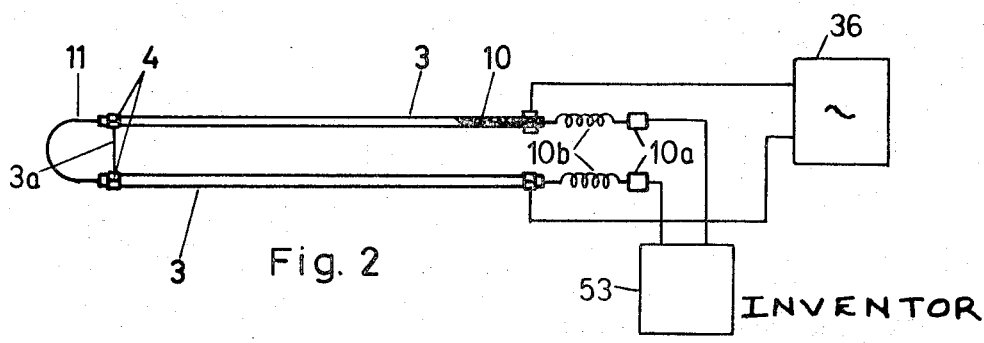
Fig. 2
INVENTOR
SVEN GUNNAR SÖREDAL
BY McAlew & Toren
ATTORNEYS INVENTOR
SVEN GUNNAR SÖREDAL
BY McGlew & Toren
ATTORNEYS

MEANS FOR MEASURING THE SQUARE OF THE STRENGTH OF A MAGNETIC FIELD

In order to solve certain measuring problems, particularly mass number measuring for mass spectrometers, it is desirable to be able to produce a magnitude which is proportional to the square of the strength of a magnetic field, i.e. to the mass number. Also in other cases it is desirable to be able to produce a magnitude which varies with the square of the strength of a magnetic field, for example when measuring the attractive force of a magnet. According to the present invention a magnetic field is measured by measuring an induced voltage proportional to the square of the strength of the field, i.e. proportional to the induction.

Mass number meters for mass spectrometers based on the measurement of the magnetic field with the help of Hall-generators are known. However, it is extremely difficult to construct such meters with a sufficient degree of accuracy. It is desirable to keep the measuring error considerably below one mass number unit. Therefore, in mass spectrometers operable up to a mass number of 1,000, the measuring accuracy should be 0.05 percent based on mass number. Because of the square dependence, this means that the magnetic field must be measured with an accuracy of 0.025 percent. The Hall-generator is based on the character of material characteristics and thus varies individually from generator to generator as well as being dependent on external circumstances, primarily the temperature. The Hall-generator must be temperature-stabilized with great accuracy, which is laborious and difficult, and also has the disadvantage that the extension length of the meter in the direction of the field will be many times greater than that of the Hall-generator. In addition to the equipment for keeping the temperature of the Hall-generator constant and for supplying the Hall-generator with a stable current, equipment is also needed for squaring the voltage from the Hall-generator. Another type of mass number meter for mass spectrometers is based on induction. In this case a loop of a conductor is placed around a magnetic pole. The loop is connected to an integrating amplifier, the output of which is connected to a squaring device. At sufficiently close intervals the magnet is demagnetized and the device is zero. However, it is extremely difficult to produce an integrator where the above-mentioned measuring accuracy is maintained over any length of time.

According to the present invention, there is provided a device for measuring the square of the strength of a magnetic field, said device comprising conductors (primary circuit) resiliently suspended in said field and connected to an alternating current source having a frequency higher than the natural mechanical frequency of the suspended conductors, said conductors forming a loop in the magnetic field, the area of the loop being varied by the forces on the conductors derived from the current and the magnetic field, whereby a voltage is induced in said conductors, said voltage being substantially proportional to the square of the strength of the magnetic field, and means for measuring the voltage induced in said loop. The primary circuit may comprise two parallel rods or tubes, electrically connected in series and suspended in leaf springs. Thus, voltage proportional to the square of the magnetic field is induced in the primary circuit. However, the voltage across the primary circuit also includes a component due to its resistance and inductance. All the ohmic and the greater part of the inductive voltage drop can be avoided by providing the device with a secondary circuit which is mechanically connected to the primary circuit. In this case, the primary circuit may comprise two tubes and the secondary circuit may consist of wires arranged inside the tubes and insulated from these. If there is a great demand for accuracy it is suitable to arrange the secondary circuit in the form of two wires, one on each side of the primary circuit conductors and mechanically connected to these. The wires are tensioned to such an extent that their free parts have a natural frequency which is far above the operating frequency. The natural frequency of the springs These contradictory desiderata (high frequency of the spring = stiff spring, low spring constant = weak spring) can be fulfilled rather satisfactorily either by making the springs as buckling springs or in the form of normal leaf springs having triangular shape.

As an alternative to wires in the secondary circuit, it is possible also here to have stiff rods or tubes which are hinged at the middle and mechanically connected to the primary circuit by struts. Both the hinge at the middle and the bearing at the ends of the rods should be realized with spring elements.

Because the conductors of the secondary circuit are brought to oscillate at their center points, but are stationary at their end points and oscillate therebetween in such a way that they are always relatively straight, the induced voltage will rather closely follow the field at the central part of the conductors, whereas the field at the ends is of less importance. This effect is even more pronounced if the primary circuit conductors are also constructed as stiff conductors which are flexible in the middle.

In order to give a more evident comprehension of the invention, a number of embodiments will be described in the following with reference to the accompanying drawings, FIGS. 1–8, wherein:

FIG. 1 shows an embodiment of the device according to the invention,

FIGS. 2–5 illustrate embodiments having a different secondary circuit,

Figure 3:
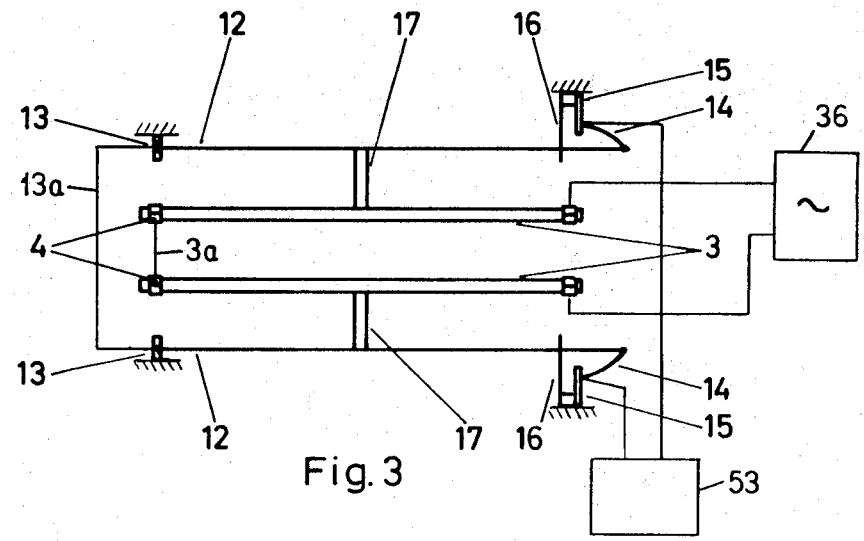

In the embodiment according to FIG. 1 the induced voltage is measured by means of a bridge. The device is adapted to give a direct reading of the mass number when used in a mass spectrometer.

In FIG. 1a, 1 and 2 designate two cooperative magnetic poles having opposite polarities, 3 designates a conductor in the form of a tube or a rod suspended in two leaf-springs 4 suitably attached to a frame or something similar, indicated at 4a, so that it can swing perpendicularly to its longitudinal axis and to the magnetic field. The device comprises two such oscillating systems, as is shown in FIG. 1b, which are electrically series-connected suitably via the springs 4 as indicated at 3a. The conductors form one branch in a bridge supplied from an AC generator 20, the other branches of the bridge comprising a capacitor 5, a fixed resistor 6 and a variable resistor 7 series-connected to an inductor 8 having variable inductance. A zero instrument (not shown) is connected to the bridge output terminals 9.

The device according to FIG. 1 functions as follows:

When an alternating current $I\sin\omega t$, where $I$ is the amplitude of the current, $\omega$ the angular frequency and $t$ is time, is supplied to the conductors 3 situated in the magnetic field, each conductor is influenced by a force $BIL\sin\omega t$, where $L$ is the length of the part of each conductor which is within the field having the induction $B$. Thus, the conductors will oscillate in the field. If the mass of the conductor is $m$, the spring constant of the springs $k$ and the loss force is presumed to be proportional to the speed and $=fs'$, where $f$ is a constant and $s'$ the derivative with respect to time of the position of the conductor, the oscillation can be expressed by the following differential equation $BIL\sin\omega = ms'' + fs' + ks$ where $s''$ is the acceleration of the conductor. If $B$ is constant, the solution of this differential equation is $$s = BIL \cdot \frac{m\omega^2 - k}{(m\omega^2 - k)^2 + f^2\omega^2} \cdot \sin \omega t$$

$$+ BIL \cdot \frac{f\omega}{(m\omega^2 - k)^2 + f^2\omega^2} \cdot \cos \omega t$$

$$+ C_1 e^{-\frac{t}{\tau}} \sin \omega_0 t + C_2 e^{-\frac{t}{\tau}} \cos \omega_0$$

and $C_1$ and $C_2$ are integration constants. The time constant may be assumed to be so small that the two latter terms may be disregarded. If the operating frequency is selected high in relation to the natural frequency of the system ($\omega$ much greater than $\omega_0$) and the losses are reasonable, an approximation may be written $$s = (BIL/m\omega^2) \cdot \sin\omega t$$

The speed will thus be $$s' = (BIL/m\omega) \cdot \cos\omega t$$

The voltage induced in the conductors by the magnetic field as the conductors move in opposite directions and the area of the loop formed by the conductors varies will thus be $$V_g = (2B^2IL^2/m\omega) \cdot \cos\omega t$$

The voltage across the conductors will also include an ohmic voltage drop $= R_L I \sin\omega t$ and an inductive voltage drop $= \omega L_L I \cos\omega t$, where $R_L$ is the resistance and $L_L$ the inductance of the conductors 3.

In a mass spectrometer accelerated ions pass through a magnetic field, the ions being deflected within the field. If the magnetic field strength and the acceleration voltage are constant, only ions having a certain mass number will obtain such a radius of deflection that they are focused in a detector.

The basic formula for the mass number $M$ in the mass spectrometer is $$M = \frac{m_j}{e_j} = \frac{B^2 R^2}{2V}$$

where $B$ = the induction, $R$ = the radius of the ion beam focused in the detector, $V$ = the acceleration voltage and $m_j$ and $e_j$ are the masses and charges of the ions. Consequently, the voltage induced can be written $V_g = (k_1 M I l\omega) \cdot \cos t$, where $k_1 = L^2 \cdot 24V/MR^2$. This induced voltage is phase-shifted 90° in relation to the current. Thus, the voltage across the oscillating system can be represented by an impedance $= R_L + k_1 M/j\omega + j\omega L_L$.

The condition of balance for the bridge shown in FIG. 1 will be $(R_L + k_1 M/j\omega + j\omega L_L)R_0 = 1/j\omega C(R_1 + j\omega L_1)$ where $R_0$ is the resistance of the resistor 6, C the capacity of the capacitor 5, $R_1$ the resistance of the resistor 7 and $L_1$ the inductance of the inductor 8.

If the real and imaginary parts are individually equalized the condition will be $L_1 = R_L R_0 C$
$R_1 = k_1 M R_0 C - \omega^2 L_L C R_0$ At varying mass numbers $R_L$, $R_0$, $C$, $k_1$, $\omega$ and $L_L$ are constant which means that $L_1$ is also constant. Thus, when ions having different mass number are focused in the detector by varying B, R,—with the bridge balanced—varies linearly with $M$. Consequently, $R_1$ can be graduated directly in mass numbers with a zero displacement $= \omega^2 L_L/k_1$. The bridge does not reach the mass number 0, particularly not if the resistance of the inductor 8 is also included in $R_1$. This is one disadvantage with this arrangement. Another disadvantage is that $L_L$ is not constant during the oscillation, but varies with the distance between the conductors 3. This gives rise to a series of even harmonics in the induced voltage. The arrangement according to FIG. 1 (possibly together with other electrical measuring circuits) is thus suitable when moderate measuring accuracy is required.

The above-mentioned disadvantages can be reduced by arranging a special secondary circuit. FIG. 2 shows an arrangement in which the primary circuit conductors 3 are constructed in the form of tubes, supplied from AC generator 36, and secondary circuit conductors 10 are arranged inside the tubes. At the terminals 10a, which are connected to the secondary circuit 10 via springs 10b the purpose of which is to make it possible to move the circuit 10 while holding the terminals 10a in a fixed position, an induced voltage proportional to the square of the magnetic field is obtained in the same way as in the primary circuit. However, since the current in the secondary circuit is zero, there is no effect from the ohmic voltage drop and at the same time the inductance in the secondary circuit is reduced to the mutual inductance between the primary and the secondary circuit. When the latter decreases, its variation of course decreases also. The primary circuit tubes 3 are suspended in leaf springs 4. The secondary circuit conductors are Wires 10 arranged inside the tubes and held in position by casting resin, for example. The wires are insulated from the tubes and series-connected to each other by means of a flexible yoke 11. A measuring circuit 53 suitable for use in connection with the secondary circuit will be described later.

In the embodiments shown so far it has been assumed that the induction B is constant along the entire length of the conductor. The device is preferably oriented perpendicular to the ion beam, since otherwise it must be made curved. Since the ions generally travel approximately at the same level as the central part of the conductor and since the field at the ends of the conductor is lower it is better, particularly with high mass number (high magnetic induction), to design the device so that the induced voltage is more dependent on the field in the middle of the conductors and less dependent on the field at the ends of the conductors. Such an arrangement is shown in FIG. 3. The primary circuit consists of two electrically series-connected (via 3a) tubes or rods 3 suspended in leaf springs 4 and supplied from an AC generator 36. The secondary circuit consists of two wires 12, attached at one end to fixed rods 13 electrically connected to each other as indicated at 13a. The wires are kept stressed by buckling springs 14 attached to angle brackets 15. The rods 13 and the brackets 15 as well as the springs 4 are suitably attached to a frame (not shown). The wires are prevented from moving laterally at a point approximately opposite the leaf springs 4 on the same side, by means of very weak leaf springs 16. In the middle, the rods 3 and wires 12 are joined by means of struts 17 which are so arranged that the rods and wires are electrically insulated from each other. The measuring circuit 53 is connected to the springs 14 or the brackets 15.

Figure 4A:
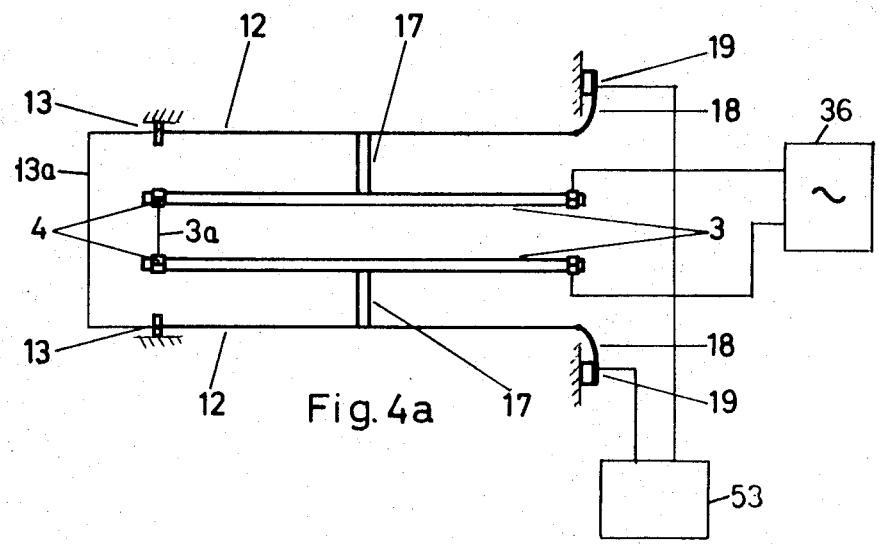
Figure 4B:
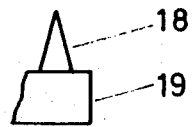

FIG. 4 shows a variation of the arrangement according to FIG. 3. The main difference is that the buckling springs 14 and leaf springs 16 are replaced by leaf springs 18 attached in rods 19. The design of the leaf springs 18 is clear from FIG. 4b. Since they are triangular in shape they will be weak in resistance pressure at the point, but still have a high natural frequency. In FIGS. 3 and 4 the pressure from the buckling springs 14 and leaf springs 18, respectively, is so great that those parts of the wires 12 which are situated between the rods 13 and the struts 17 and the leaf springs 16 (FIG. 3) and between the struts 17 and leaf springs 18 (FIG. 4) have a natural frequency which is high in relation to the operating frequency.

Figure 5:
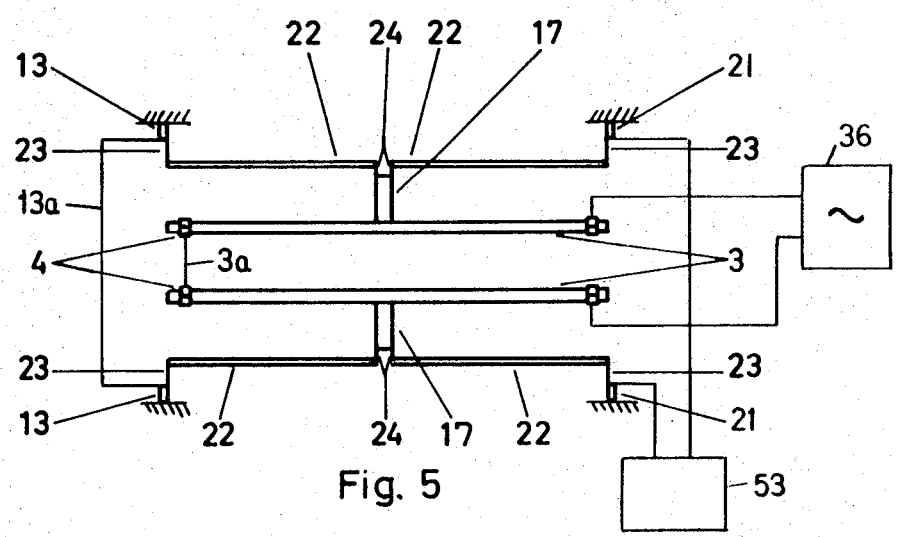

The arrangement according to FIG. 5 also comprises a primary circuit consisting of two rods or tubes 3 suspended in leaf springs 4. Each secondary conductor consists of two bars 22. The bars may consist of tubes, rods or profiled sheets. The bars 22 are suspended at both ends by means of short leaf springs 23, 24, which are perpendicular to the longitudinal direction of the bars 22. The leaf springs 23 are attached at the other end to fixed rods 13 and 21, respectively. The rods 13 are electrically connected to each other (via 13a) whereas the rods 21 form the poles of the secondary circuit. The leaf springs 24 are connected at the other end to struts 17 which are in turn flexibly attached to the primary rods 3. The struts 17 are either made of insulating material or insulated from the rods 3 or from the electrical connection between the leaf springs 24.

Figure 6:
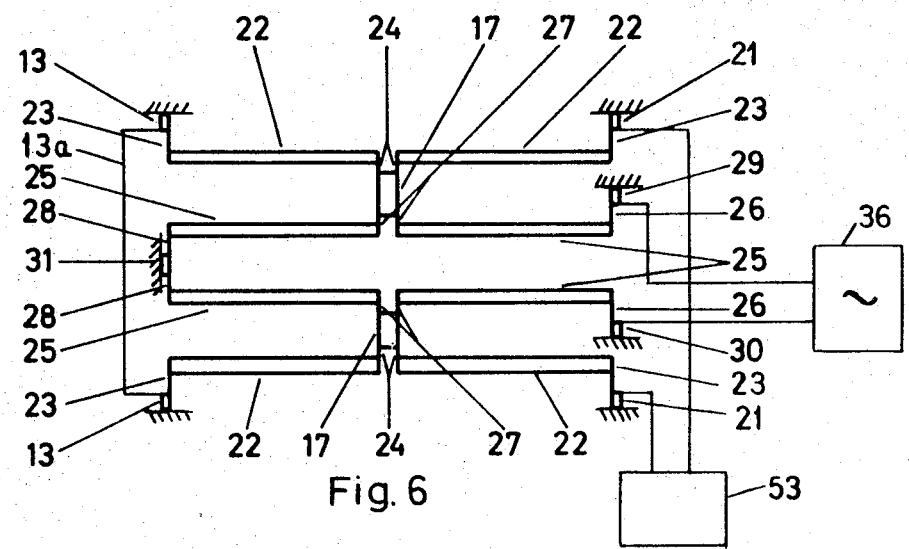
FIG. 6 shows an embodiment having a special design of the primary and the secondary circuits.

FIG. 6 shows an arrangement where the conductors of both the primary and the secondary circuits consist of pairs of bars 22, 25 respectively. The bars 25 are attached to leaf springs 26, 27, 28 perpendicular to the longitudinal direction of the bars 25. The springs 26 are attached to fixed rods 29, 30 which form the poles of the primary system. The springs of each pair of springs 27 and 28 are electrically connected to each other. The springs 28 are attached to a fixed rod 31. The bars 22 are arranged in the same way as in FIG. 5. Thus the secondary system comprises the components 13a, 21, 22, 23, 24. The leaf springs 24 and 27 are mechanically joined in pairs by means of struts 17. The device must be dimensioned so that the natural frequency of the whole system consisting of two bars 22, two bars 25, two leaf springs each of 23, 24 and 27 and one each of the leaf springs 26 and 28, is low in relation to the operating frequency, whereas the natural frequency of each bar 22 and 25 and leaf spring must be high in relation to the operating frequency.

Figure 7:
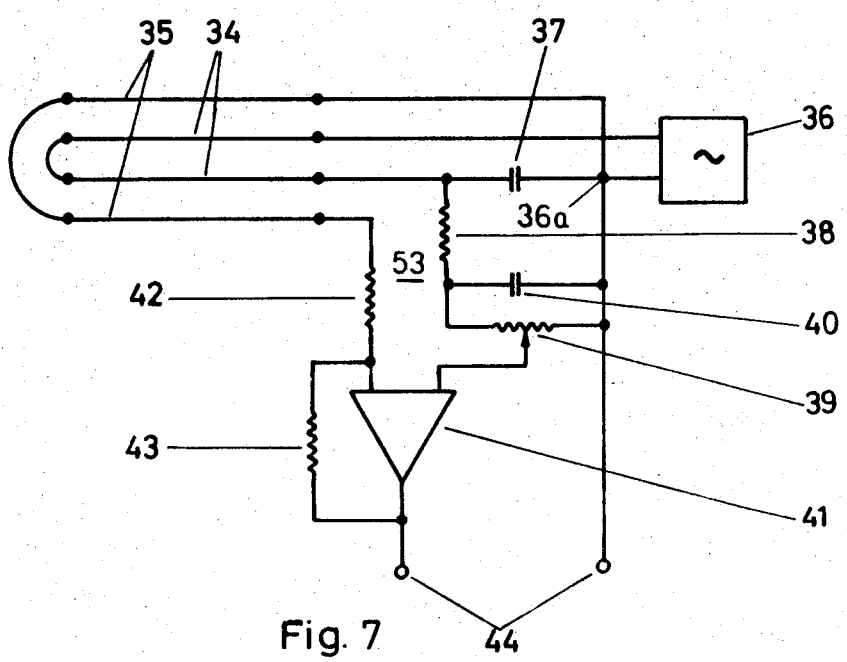
FIG. 7 shows a measuring circuit with compensation for use in connection with a secondary circuit.

FIG. 7 shows a circuit 53 which is suitable for measuring the output voltage of the arrangements shown in FIG. 2–6. The primary circuit conductors 3 or 25 is shown as two lines 34. These are mutually electrically connected and also connected to the AC generator 36 through a capacitor 37. Parallel with the capacitor 37 a resistor 38 is connected in series with a precision voltage divider 39. The voltage divider 39 is connected in parallel with a capacitor 40. A voltage is withdrawn from the voltage divider 39 and supplied to one input of an operation amplifier 41. The other input of the amplifier is connected to one pole of the secondary circuit 35 (conductors 10, 12 or 22), the other pole of which is connected to a zero point 36a. The operation amplifier has a negative feedback by means of two resistors 42, 43. A zero instrument (not shown) is connected to the output 44. The mass number is in this case indicated by the position of the voltage divider 39 when the output voltage at 44 is 0.

In the secondary circuit a voltage is induced by generation which is proportional to the mass number and to the current divided by the frequency, as above. The voltage drop across the capacitor 37 is also proportional to the quotient between the current and the frequency. This means that the ratio between the voltage induced by generation and the voltage across the capacitor is a measure of the mass number. Furthermore, these voltages are substantially in phase. A slight error is obtained in the phase ratio due to the losses in the oscillating system and also a displacement differing from 90° due to the losses in the capacitor 37 and because the capacitor 37 is connected in parallel with the resistors 38 and 39. In order to compensate for all these phase displacements the capacitor 40 is connected in parallel with the voltage divider 39. Since the phase displacements may be considered as constant of varying mass number and the resistance of the voltage divider 39 is constant, the value of the capacitor 40 may also be kept constant.

It is also possible to compensate the mutual inductance between the primary and the secondary circuit by introducing a variable mutual inductance between the connections to the primary and secondary circuits. It is of course only the constant part of the mutual inductance which can be compensated. The variation in mutual inductance during the oscillation mentioned previously, can only be reduced by reducing the mutual inductance by means of greater distance between the primary and secondary circuits. Furthermore it is possible to introduce digitalizing means in order to obtain the mass number in a digital form.

As mentioned above, the natural frequency of the oscillating system must be low in relation to the operating frequency, whereas the natural frequencies of the individual components must be high in relation to the operating frequency. Conversely, it may be said that the operating frequency must be selected so that it is high in relation to the natural frequency of the oscillating system and low in relation to the natural frequencies of the individual components. This results in relatively narrow limits in the choice of operating frequency.

It is often desirable for the device to be able to measure with great accuracy even with rapidly varying fields. However, the device will give a correct measuring value only when the oscillating system oscillates with a speed that corresponds to the strength of the magnetic field. The question of the highest permissible variation speed for the magnetic field can be judged by the following mathematical consideration. The magnetic field is assumed to vary linearly with the time. Accordingly, one may write:

$B = B_0 + bt$

The differential equation for the oscillation is then:

$(B_0+b)IL\sin\omega t = M \cdot s'' + f s' + ks$

The solution to this equation can be written $s = s_0 t \sin\omega t + s_1 \sin\omega t + s_2 t \cos\omega t + s_3 \cos\omega t + s_4 \frac{t}{\tau} \sin\omega t + s_5 \frac{t}{\tau} \cos\omega t$ By deriving this expression and inserting the results in the differential equation and comparing terms having similar time dependency, an expression is obtained for $s$. If the average distance between the secondary conductors is $a$, the flow $\Phi$ between these will be $\Phi = BL a + 2s)$ By derivation of this expression the induced voltage is obtained. This contains a direct current part which is dependent on the variation of the field and which can be assumed to disappear during processing of the measured voltage. The alternating current part of the voltage can be written:

$$V = 2L^2 I \left[ \frac{\omega n}{n^2+p^2} \cdot B_0^2 + \frac{p(n^2+4nk-p^2)}{(n^2+p^2)^2} \cdot B_0 b \right.$$
$$\left. - \frac{n^3+n^2k-p^2k}{\omega(n^2+p^2)^2} \cdot b^2 \right] \cos\omega t + 2L^2 I \left[ \frac{p\omega}{n^2+p^2} \cdot B_0^2 \right.$$
$$\left. + 2 \cdot \frac{n^2k-np^2-p^2k}{(n^2+p^2)^2} \cdot B_0 b + \frac{p(3n^2+4nk+p^2)}{\omega(n^2+p^2)^2} \cdot b^2 \right] \sin\omega t$$

where $n = m\omega^2 - k$ and $p = f\omega$.

If the operating frequency is three to five times higher than the natural frequency of the system, all terms containing $B_0 \cdot b$ and $b^2$ will be of the order of magnitude $10^{14}$ to $10^{17}$ of the first term, at those values of $f$ which can be reached in practice and when $b$ is of the same order of magnitude as $B_0$, i.e. upon a change of the magnetic field from 0 to the maximum value within 1 second. This means that the induced voltage has the correct magnitude at every moment even if the field changes so rapidly that there is a considerable variation in the magnetic field during every half-period of the current.

I claim:

1. An apparatus for measuring the square of the strength of a magnetic field, comprising conductive means adapted to be placed in the field, support means for resiliently supporting said conductive means and forming with said conductive means an oscillatable system having a natural resonant frequency, oscillation producing means for oscillating said conductive means in the field so as to generate a voltage thereby, said oscillation producing means including alternating current source means having a frequency greater than the natural resonant frequency of said system and connected to said conductive means for passing a current through said conductive means, and measuring means coupled to said conductive means for measuring the voltage generated in said conductive means.

2. An apparatus as in claim 1, wherein said conductive means forms a loop.

3. An apparatus as in claim 1, wherein said conductive means includes a pair of series connected parallel rods.

4. An apparatus as in claim 3, wherein said support means includes a pair of leaf springs for mounting said rods.

5. An apparatus as in claim 1, wherein said measuring means includes a bridge having four arms, said conductive means forming an arm of said bridge.

6. An apparatus as in claim 1, wherein said measuring means include circuit means forming three arms of a bridge, and coupling means for coupling the voltage generated by said oscillation producing means in said conductive means into said circuit means so as to form the fourth arm of the bridge.

7. An apparatus as in claim 1, wherein said measuring means includes conductor means coupled to said conductive means and forming a secondary circuit with respect to said conductive means, said conductor means being mechanically connected to said conductive means and movable therewith.

8. An apparatus as in claim 7, wherein said conductive means forms a primary circuit and includes a pair of conductive tubes and said secondary circuit includes a pair of wires located inside said tubes.

9. An apparatus as in claim 7, wherein said conductive means includes a pair of conductors, and wherein said secondary circuit includes a pair of wires positioned parallel to the conductors on opposite sides of said conductors, said conductors being arranged parallel with each other, said conductors being connected to each other electrically, suspension means for resiliently suspending said wires at their ends, and strut means for mechanically connecting the conductors to the middle of the wires.

10. An apparatus as in claim 9, wherein said strut means flexibly attach said conductors to said wires.

11. An apparatus as in claim 9, further comprising prestressing means to prestress the wires so that their natural frequency is high relative to the frequency of the alternating current.

12. An apparatus as in claim 11, wherein said prestressing means include buckling springs having a comparatively low spring constant.

13. An apparatus as in claim 11, wherein said prestressing means include a pair of leaf springs forming an isosceles triangle with one of said wires extending between equal sides formed by said leaf springs.

14. An apparatus as in claim 7, wherein said secondary circuit includes a pair of rigid conductors, means for resiliently suspending each of said conductors at its end and hinging it in the middle, and means for mechanically connecting each of said rigid conductors to said conductive means so as to move therewith.

15. An apparatus as in claim 14, wherein said conductive means include a pair of conductors which are flexible in the center, said means for mechanically connecting said wires to said conductive means connecting said conductors to said wires from the middle of said conductors.

16. An apparatus as in claim 1, wherein said measuring means comprises a bridge, said conductive means forming one branch of the bridge, said bridge having three other branches, one of said other branches comprising a capacitor, one of said other branches comprising a resistor, and one of said branches comprising a variable resistor series-connected with an inductor having a variable conductance.